United States Patent [19]

Hashimoto et al.

[11] Patent Number: 5,352,399
[45] Date of Patent: Oct. 4, 1994

[54] PROCESS FOR TWO-STAGE INJECTION MOLDING OF AIR-CONDITIONING BLOW-OUT PORT DEVICE

[75] Inventors: Kazuhiro Hashimoto; Hiroyuki Okamoto, both of Kawagoe, Japan

[73] Assignee: Moriroku Kabushiki Kaisha, Tokyo, Japan

[21] Appl. No.: 62,838

[22] Filed: May 18, 1993

[30] Foreign Application Priority Data

Dec. 1, 1992 [JP] Japan .................. 4-321961

[51] Int. Cl.⁵ .................. B32B 1/00; B32B 3/00; B32B 7/04
[52] U.S. Cl. .................. 264/242; 264/264; 425/DIG. 34
[58] Field of Search .................. 264/242, 264; 425/DIG. 34

[56] References Cited

U.S. PATENT DOCUMENTS 4,414,170 11/1983 Sano .................. 264/242
4,569,457 2/1986 Hatakeyama et al. .
4,702,156 10/1987 Sano .................. 264/242 X

FOREIGN PATENT DOCUMENTS 2627346 12/1976 Fed. Rep. of Germany ...... 264/242
1554635 10/1979 United Kingdom .
2133340 7/1984 United Kingdom .

*Primary Examiner*—Karen Aftergut
*Attorney, Agent, or Firm*—Armstrong, Westerman, Hattori, McLeland & Naughton

[57] ABSTRACT

In two-stage injection molding of a blow-out port device including a housing of synthetic resin, which includes pairs of shaft bores provided in a coaxial arrangement in opposed wall portions of a peripheral wall to extend through the opposed wall portions, and a plurality of blades of synthetic resin which each include a pair of support shafts projectingly provided at opposite ends of a blade body disposed within the housing and rotatably fitted in the shaft bores, the following steps are used: a primary injection step for forming the housing; a secondary injection step for forming blade bodies by using shaft bores in the housing as support shaft-forming cavities; a step of permitting the blow-out port device to be left on one of opening/closing dies by utilizing protrusion fitted in recesses formed in the housing; and a step of bringing ejector pins into abutment against rear edges of the blades to push-off the blow-out port device from the opening/closing die. Thus, the air-conditioning blow-out port device produced by the two-stage injection molding process can be released from the dies without deterioration of its quality.

1 Claim, 15 Drawing Sheets

5,352,399

PROCESS FOR TWO-STAGE INJECTION MOLDING OF AIR-CONDITIONING BLOW-OUT PORT DEVICE

BACKGROUND OF THE INVENTION

1. Field of the Invention

The present invention relates to a process for two-stage injection molding of an air-conditioning blow-out port device mounted in an instrument panel in an automobile, and particularly, to a process for two-stage injection molding of an air-conditioning blow-out port device comprising a housing of synthetic resin, which includes pairs of shaft bores provided in a coaxial arrangement in opposed wall portions of a peripheral wall to extend through the opposed wall portions, and a plurality of blades of synthetic resin which each include a pair of support shafts projectingly provided at opposite ends of a blade body disposed within the housing and rotatably fitted in the shaft bores.

2. Description of the Prior Art

There is a conventionally known two-stage injection molding process of this type, which comprises forming a housing at a primary injection step, and forming blades by using the shaft bores in the housing as support shaft-forming cavities and then bringing ejector pins into abutment against, for example, an end face of the housing, thereby releasing a resulting blow-out port device.

With the above prior art process, the releasing of the housing is superior, because it has been set in opening/closing dies in the secondary injection molding step, whereas the releasing of the blades is inferior, because they have been formed at the second injection molding step to closely adhere to a molding surface.

With the prior art process, if the die opening is performed under such a situation after the secondary injection molding, the support shaft of each blade may be bent or broken in some cases, because no retaining means is provided between the housing and one of opening/closing dies which must be intrinsically stationary, and hence, the housing follows the other opening/closing die, while each of the blades is in close adhesion to the one opening/closing die. In releasing the device from the dies, each of the blades is pushed out through the housing and hence, a large burden is applied to each of the support shafts, likewise resulting in a problem of a damage to each support shaft, which may damage the blade body.

Accordingly, it is an object of the present invention to provide a two-stage injection molding process of the above-described type, wherein the damages to each of the blade bodies and each of the support shafts can be avoided.

SUMMARY OF THE INVENTION

To achieve the above object, according to the present invention, there is provided a process for two-stage injection molding of an air-conditioning blow-out port device comprising: a housing of synthetic resin, which includes pairs of shaft bores provided in a coaxial arrangement in opposed wall portions of a peripheral wall to extend through the opposed wall portions, and a plurality of blades of synthetic resin which each include a pair of support shafts projectingly provided at opposite ends of a blade body disposed within the housing and rotatably fitted in the shaft bores, the process comprising the steps of: closing a pair of housing-forming opposed opening/closing dies to clamp, between both the opening/closing dies, a plurality of first opposed slide dies each including a plurality of shaft bore-forming cores and a plurality of protrusions juxtaposed with the cores, thereby defining a housing-forming cavity so as to include the shaft bore-forming cores and the protrusions; primarily injecting a synthetic resin into the cavity to form the housing including a plurality of recesses in the opposed wall portions, the recesses being formed by the corresponding protrusions and opened into outer surfaces of the opposed wall portions; closing one of the opening/closing dies for forming a front edge of each blade body located on the side of a front surface of the housing, while closing another opening/closing die for forming a rear edge of each blade body, the other opening/closing die including a plurality of second opposed slide dies each having a plurality of protrusions corresponding to the recesses of the housing, thereby clamping the second slide dies between both these opening/closing dies, with the housing being clamped between these opening/closing dies and the second slide dies and with the protrusions of the second slide dies being fitted into the recesses of the housing, respectively, while defining blade body-forming cavities between these opening/closing dies; using the shaft bores in the housing as support shaft-forming cavities and secondarily injecting a synthetic resin into the blade body-forming cavities and the support shaft-forming cavities to form the blade bodies; opening both the opening/closing dies, with the blow-out port device being left on the other opening/closing die by fitting the protrusions of the second slide dies into the recesses in the housing; and separating the protrusions of the second slide dies out of the corresponding recesses, and then bringing a plurality of ejector pins provided on the other opening/closing die into abutment against the rear edges of the blade bodies respectively to push off the blow-out port device from the other opening/closing die.

With the above arrangement, when opening the dies after the secondary injection, the housing can reliably be left in the other opening/closing die by the fitting of both the protrusions and recesses. In the subsequent separating step of the device, the ejector pins push off the blades. Therefore, only a force for supporting the housing is applied to the support shafts, and such a force can not damage the support shaft. Further, the push off force is directly applied to the blades which are closely contacted with the forming surface and thus, the blades can easily be separated from the dies and the blade body can not be damaged.

Further, the recesses of the housing are located on the outer surface of the opposed wall portions which are disposed within the instrument panel. Therefore, the external appearance of the device is not spoiled. Also, the abutting portion of the ejector pins of the blades are disposed at the rear edge of the blade, which can not be seen from the front of the device, which does not spoil the external appearance of the device.

The above and other objects, features and advantages of the invention will become apparent from the following description of preferred embodiments, taken in conjunction with the accompanying drawings.

DESCRIPTION OF THE PREFERRED EMBODIMENTS

Figure 1:
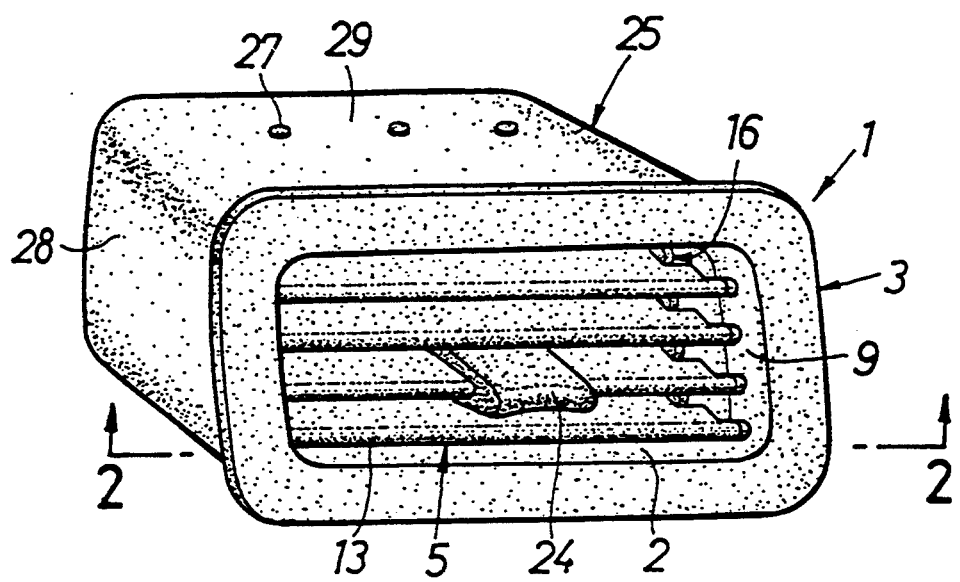
FIG. 1 is a perspective view illustrating one example of an air-conditioning blow-out port device.
Figure 2:
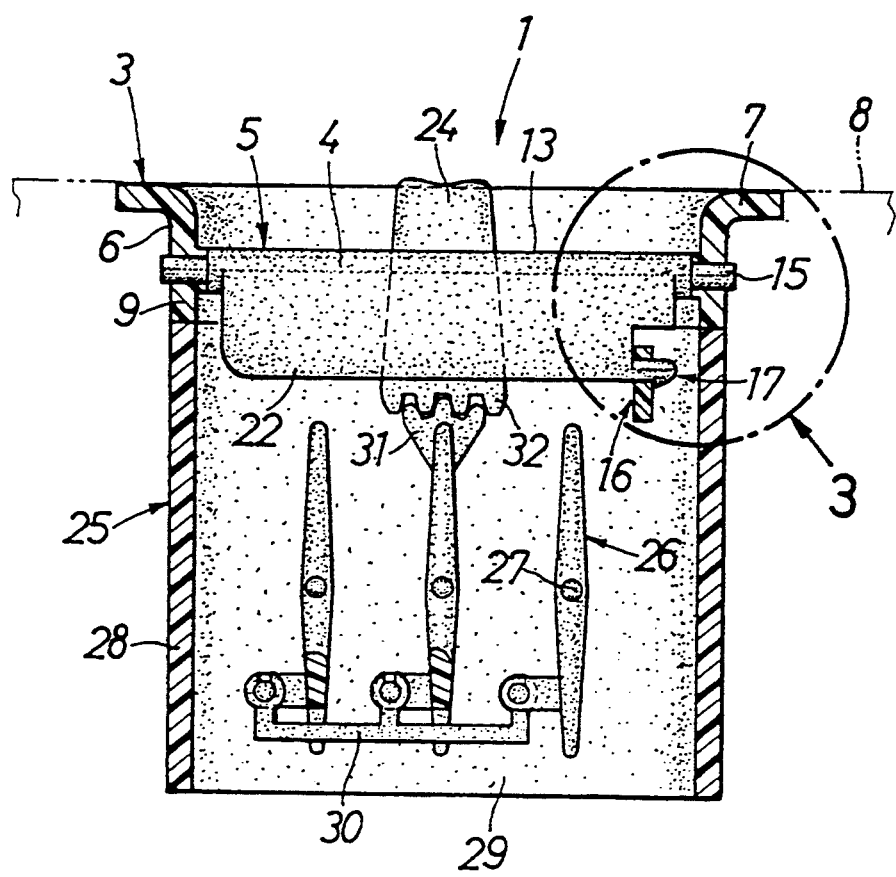
FIG. 2 is a sectional view taken along a line 2—2 in FIG. 1.

FIGS. 1 to 5 illustrate one example of an air-conditioning blow-out port device 1. As best shown in FIGS. 1 and 2, this device 1 is comprised of a housing 3 of synthetic resin having a substantially rectangular blow-out port 2, and a plurality of blades 5 of synthetic resin having blade bodies 4 disposed within the housing 3 for adjusting the vertical direction of wind. The housing 3 has a front flange 7 at a front end of a peripheral wall 6 thereof and is adapted to be embedded into an instrument panel 8 of an automobile with a front surface of the front flange 7 being aligned with a surface of the instrument panel 8.

Figure 3:
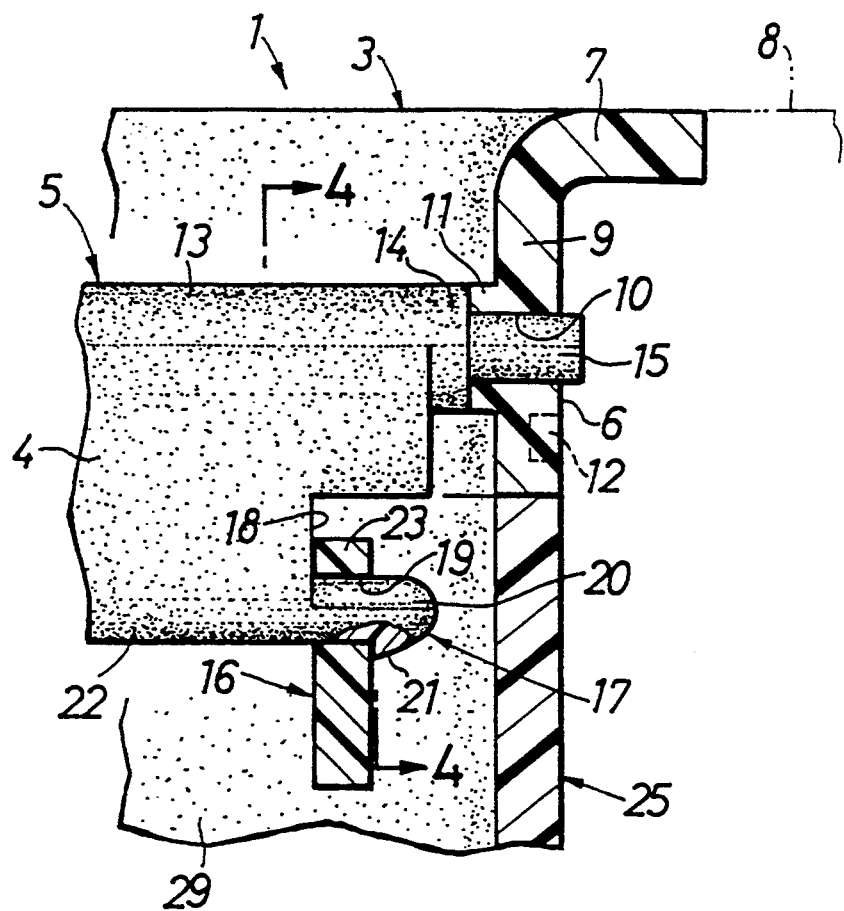
FIG. 3 is an enlarged view taken along an arrow 3 in FIG. 2.
Figure 4:
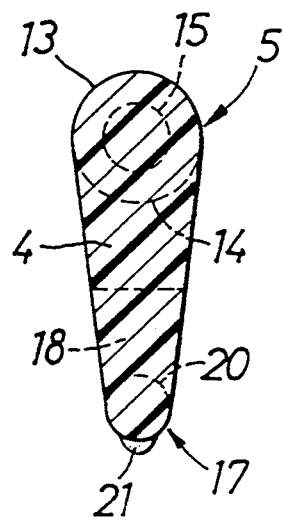
FIG. 4 is a sectional view taken along a line 4—4 in FIG. 3.

As best shown in FIGS. 2 and 3, the peripheral wall 6 of the housing 3 is provided, at left and right opposed wall portions 9 thereof, with pairs of shaft bores 10 arranged coaxially to extend through the opposed wall portions 9, and pairs of circular-section bosses 11 located coaxially with corresponding one of the shaft bores 10 to define an opening of the shaft bore 10 inside the opposed wall portion 9. Recesses 12 are opened into outer surfaces of the opposed wall portions 9 and are used at a step of releasing of the device 1 from a molding apparatus.

Each of the blades 5 is provided, at a front edge 13 of the blade body 4, with a pair of protruding portions 14 abutting against the pair of bosses 11 and having the same diameter as the bosses 11, and a pair of support shafts 15 which are projectingly provided coaxially on end faces of the protruding portions 14 and turnably fitted in the shaft bores 10, respectively. A front edge 13 of the blade body 4 is formed to have the same diameter as the protruding portion 14, as clearly shown in FIG. 4, whereby the front edge 13 is continuous with the protruding portions 14 with no step created therebetween.

If an area of each blade 5 around its mounting portion is constructed in the above manner, even if each blade 5 is turned to any wind direction-adjusted position, each protruding portion 14 and each boss 11 cannot be offset from each other and therefore, the appearance of the area around the mounting portion can be improved.

Figure 5:
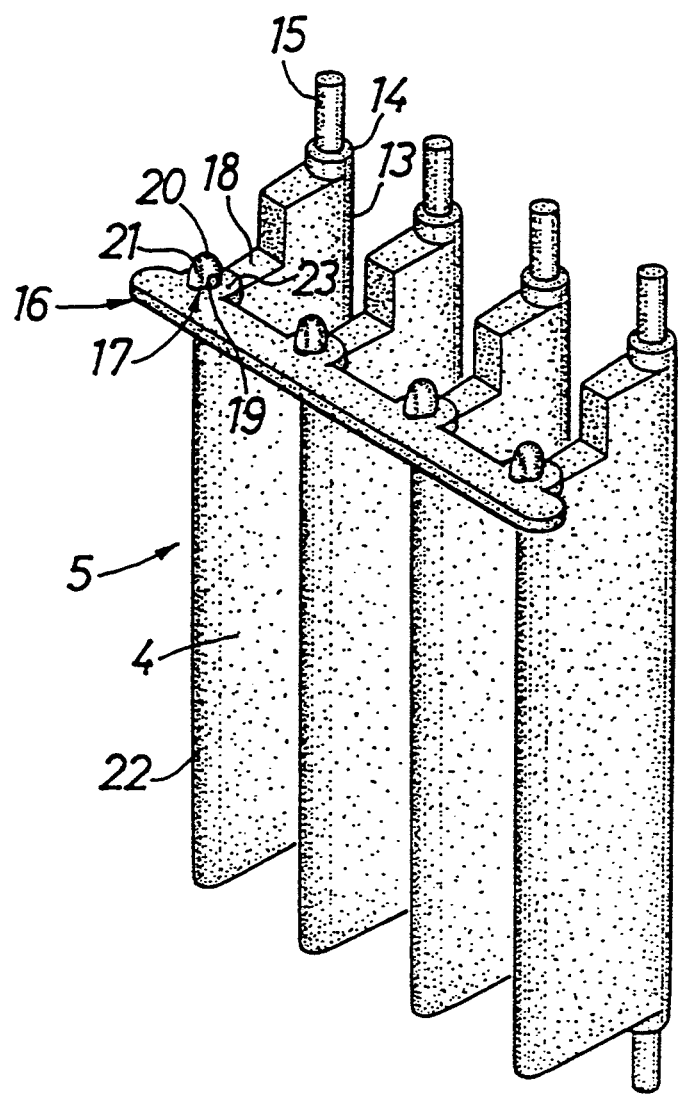
FIG. 5 is a perspective view illustrating the relation between blades and an interlocking link.

The blades 5 are adapted to be turned in operative association with one another and to this end, each blade 5 has a pivotally mounting portion 17 for an interlocking link 16. As best shown in FIGS. 3 and 5, the pivotally mounting portion 17 is comprised of a pivotally supporting shaft 20 projectingly provided on a notch-like common end 18 of each blade body 4 in parallel to the support shaft 15 to extend through a pivotally supporting bore 19 in the interlocking link 16, and a slip-off preventing projection 21 located at a protruding end of the pivotally supporting shaft 20 to engage an opening edge of the pivotally supporting bore 19. The slip-off preventing projection 21 protrudes outwardly from a rear edge of the blade body 4 and is forcedly inserted through the pivotally supporting bore 19 in the interlocking link 16 by utilizing the resilient property of an annular portion 23 of the interlocking link 16. As best shown in FIGS. 1 and 2, an operating knob 24 is slidably mounted to only one of the blade body 4 for sliding movement in a longitudinal direction of the blade body 4. Thus, if the operating knob 24 is turned vertically, the blades 5 are turned upwardly or downwardly through the interlocking link 16.

With the above-described construction, the pivotally mounting portion 17, i.e., the pivotally supporting shaft 20 and the slip-off preventing projection 21 can be accommodated within a range of the thickness of each blade 5, thereby reducing the spacing between the blades. This enables the number of the blades 5 to be increased, so that the direction of wind can be adjusted in accordance with any desire. It does not look that the pivotally mounting portion 17 protrudes from one surface of the blade 5 as viewed at any rotated position of the blade 5, leading to a good appearance.

Referring to FIGS. 1 and 2, another housing 25 of synthetic resin is bonded to a rear end of the housing 3, and a plurality of blades 26 of synthetic resin for adjusting the lateral direction of wind are mounted within the housing 25. Support shafts 27 are mounted at opposite ends of each of the blades 26, respectively, and are rotatably supported respectively on upper and lower opposed wall portions 29 which constitute a peripheral wall 28 of the housing 25, and an interlocking link 30 is pivotally supported on the blades 26. A toothed portion 31 is formed on the middle blade 26 and meshed with a toothed portion 32 of the operating knob 24. Thus, if the operating knob 24 is slid in a lateral direction, the blades 26 are turned to change the direction of wind to such lateral direction.

A two-stage injection molding process for producing the above-described air-conditioning blow-out device 1 will now be described. In this molding process, a procedure is employed which comprises forming the housing 3 at a primary injection step, and forming the blades 5 at a secondary injection step by use of the shaft bores 10 in the housing 3 as cavities for molding the support shafts.

FIGS. 6 to 11 illustrate a primary injection molding apparatus 33 used at the primary injection step for forming the housing 3. The apparatus 33 comprises a first movable opening/closing die 34, a second stationary opening/closing die 35 opposed to the first die 34, and a plurality (e.g., a pair in the illustrated embodiment) of first slide dies 36 adapted to be clamped between both the opening/closing dies 34 and 35. The first slide dies 36 each comprises a plurality of shaft bore-forming cores 37, and a plurality of protrusions 38 each arranged in a row with each core 37 and are slidably mounted in an opposed relation to each other on the second opening/closing die 35.

First step

Figure 6:
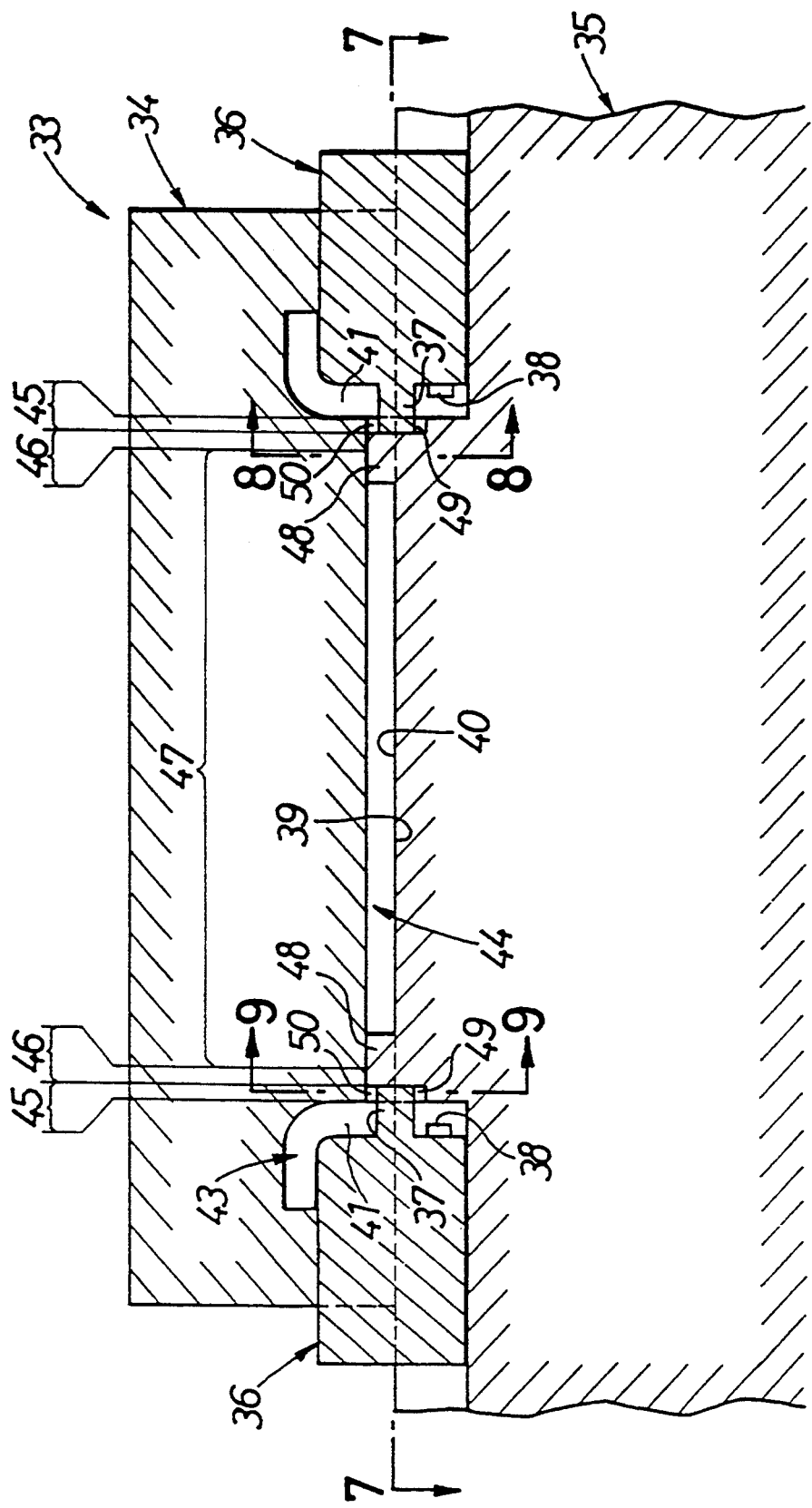
FIG. 6 is a longitudinal sectional view illustrating one example of a primary injection molding apparatus and corresponding to a sectional view taken along a line 6—6 in FIG. 7.
Figure 7:
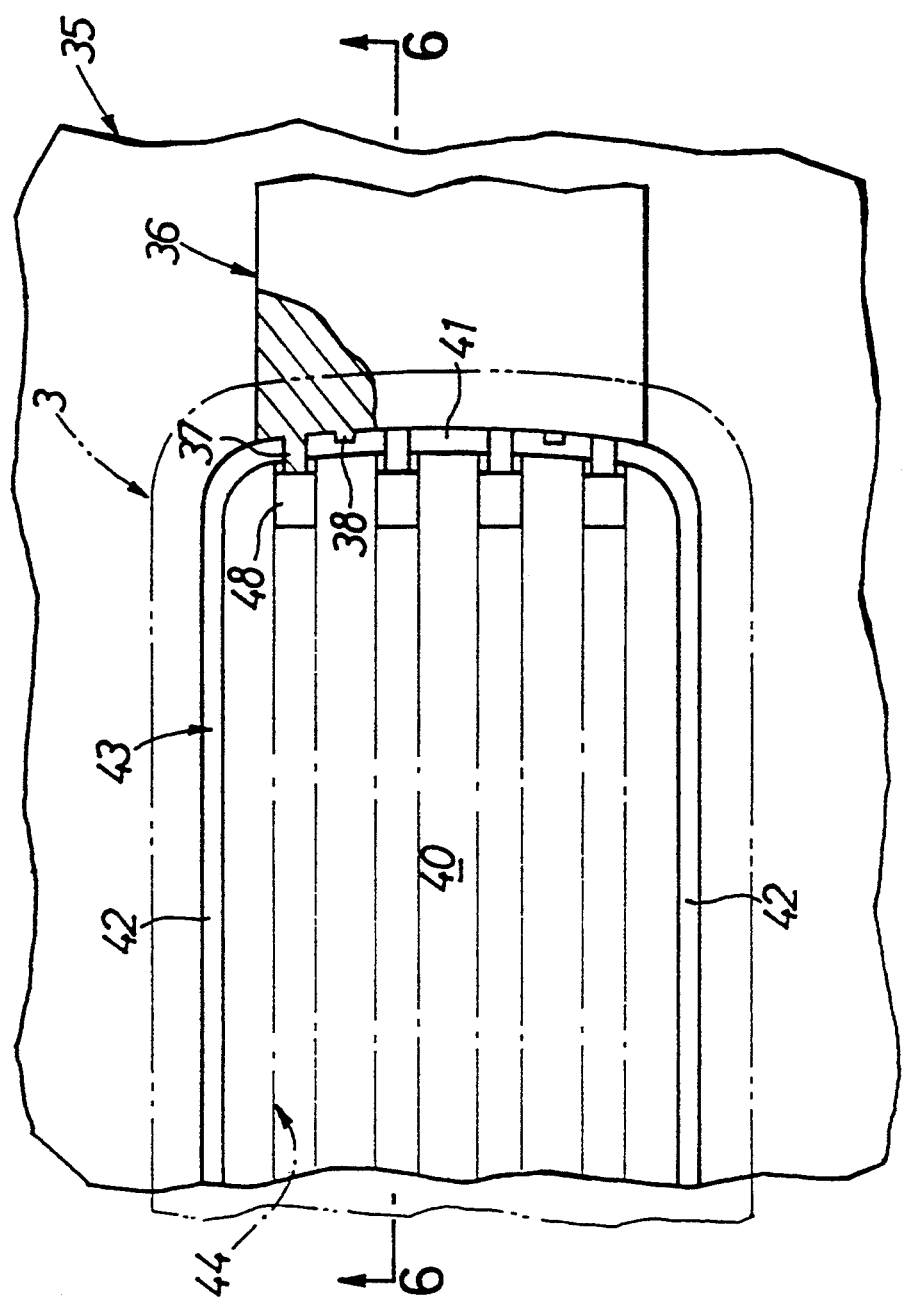
FIG. 7 is a view taken along a line 7—7 in FIG. 6.

As is shown in FIGS. 6 and 7, the first opening/closing die 34 is lowered, and both the opening/closing dies 34 and 35 are closed, and the first slide dies 36 are clamped between both the opening/closing dies 34 and 35.

This causes an axis of each shaft bore-forming core 37 of the first slide die 36 to be aligned with matched surfaces 39 and 40 of the opening/closing dies 34 and 35, thereby defining a pair of areas 41 corresponding to the pair of opposed wall portions (which will be referred to as opposed wall portion-corresponding areas hereinafter) and including the cores 37 and the protrusions 38, and a pair of areas 42 corresponding to the pair of opposed wall portions and substantially perpendicular to the areas 41. Both the areas 41 and 42 constitute a first cavity 43 for forming the peripheral wall 6 and the flange 7 of the housing 3.

The opening/closing die 34 has a plurality of semi-circular section recesses 44 opened into the matched surface 39 thereof with opposite ends communicating with the first cavity 43. Each of opposite ends of each first recess 44 is an area 45 corresponding to the boss (which will be referred to as boss-corresponding area hereinafter) and is used to form a half of the boss 11. A portion located inside each of the boss-corresponding areas 45 is a protruding portion-corresponding area 46 and used to form a half of the protruding portion 14 of each blade 5. Further, there is a front edge-corresponding area 47 lying between both the boss-corresponding areas 46 and used to form the front edge 13 of each blade 13.

Figure 8:
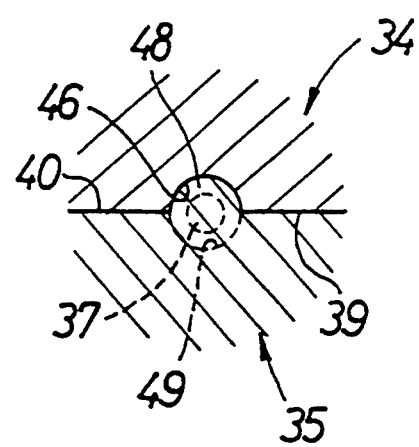
FIG. 8 is a sectional view taken along a line 8—8 in FIG. 6.

As is shown in FIGS. 6, 7 and 8, a plurality (e.g., a pair per first recess 44 in the illustrated embodiment) of semi-circular section dammed projections 48 projectingly provided on the matched surface 40 of the second opening/closing die 35 are each fitted into the protruding portion-corresponding area 46 in the first recesses 44 simultaneously with formation of the first cavity 43, respectively.

Figure 9:
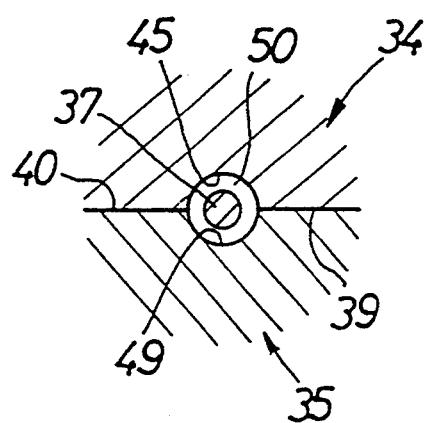
FIG. 9 is a sectional view taken along a line 9—9 in FIG. 6.

As a result, a plurality of second cavities 50 for forming the bosses 11 are defined around tip ends of the shaft bore-forming cores 37 which abut against end faces of the dammed projections 48, as shown in FIGS. 6, 7 and 9, by cooperation of a pair of semi-circular section recesses 49 opened into the matched surface 40 of the second opening/closing die 35 with the boss-corresponding area 45 of each first recess 44. Each of the second cavities 50 communicates with the first cavity 43, but is disconnected from the front edge-corresponding area 47 of each first recess 44 by the dammed projections 48.

Second step

Figure 10:
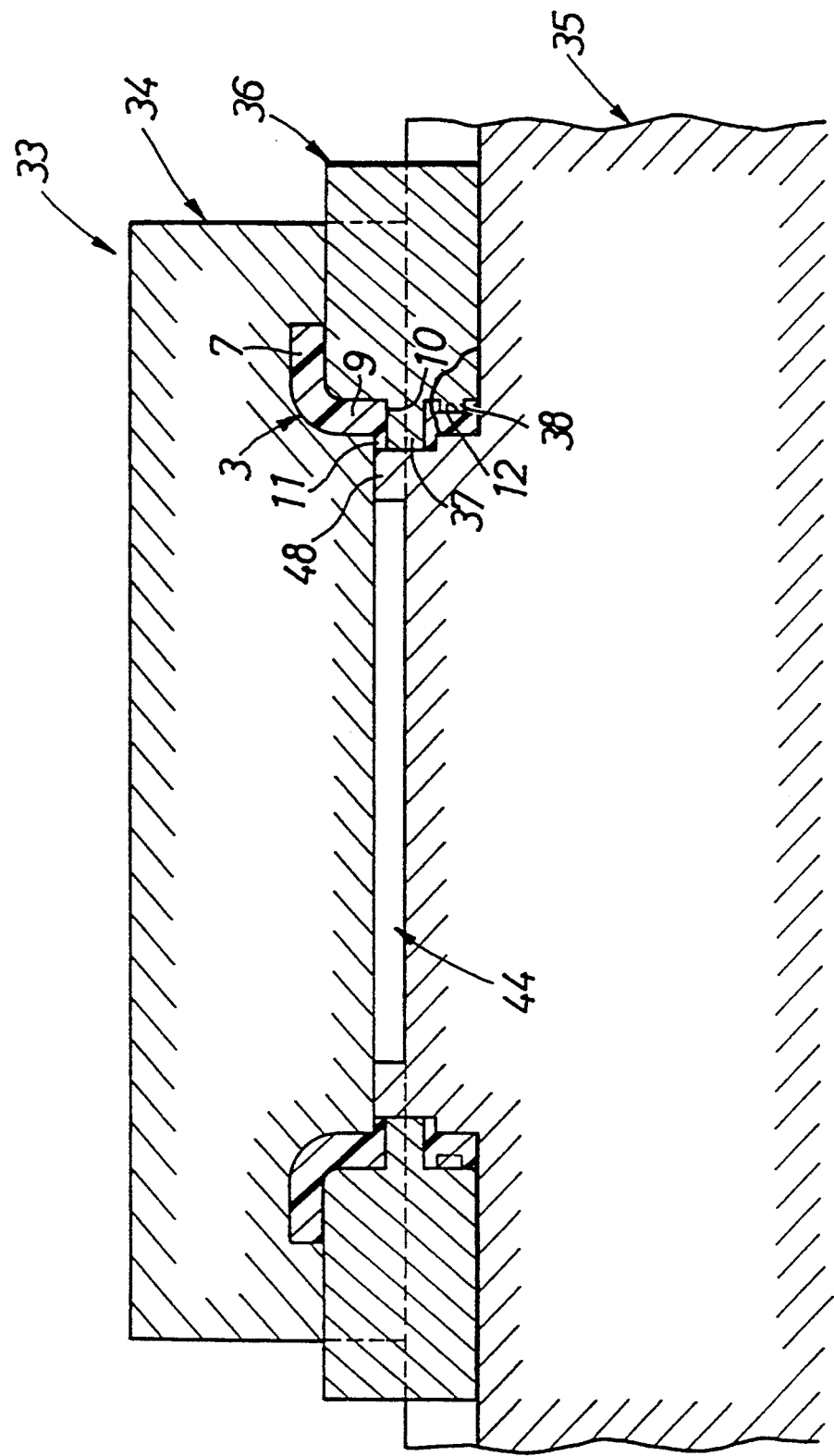
FIG. 10 is a longitudinal sectional view of the primary injection molding apparatus shown with a housing formed.

As is shown in FIG. 10, a polyethylene (PP)-based resin as a synthetic resin is primarily injected through a gate (not shown) into the first cavity 43 and the second cavities 50 to form the housing 3. The plurality of recesses 12 for use at the releasing step are formed in the outer surfaces of the opposed wall portions 9 of the housing 3 by the protrusions 38. In this case, the boss 11 is formed distinctly, because the protruding portion-corresponding area 46 of each first recess 44 is closed by the dammed projection 48.

Third step

Figure 11:
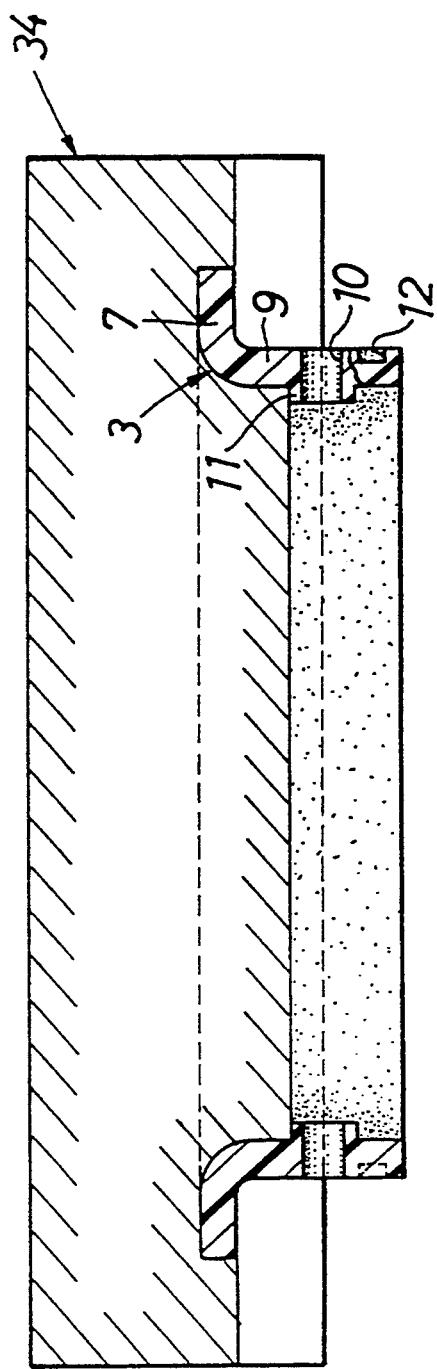
FIG. 11 is a longitudinal sectional view of a first opening/closing die with the housing attached thereto.

Both the first slide dies 36 are retreated, so that the shaft bore-shaping cores 37 are removed out of the corresponding shaft bores 10. Then, the first opening/closing die 34 is lifted, so that both the opening/closing dies 34 and 35 are opened with the housing 3 left attached to the first opening/closing die 34, as shown in FIG. 11.

The molding of the housing 3 is completed via the above-described steps.

FIGS. 12 to 17 illustrate a secondary injection moulding apparatus 51 used at the secondary injecting step for forming the blades 5. The apparatus 51 comprises the first movable opening/closing die 34 commonly used in the primary injection molding apparatus 33, a third stationary opening/closing die 52 opposed to the first movable opening/closing die 34, and a plurality (e.g., a pair in the illustrated embodiment) of second slide dies 53 and 54 adapted to be clamped between both the opening/closing dies 34 and 52. The second slide dies 53 and 54 are slidably mounted in an opposed relation to each other on the third opening/closing die 52 and each include a plurality of protrusions 55 corresponding to the plurality of recesses 12 opened in the outer surface of each of the opposed wall portion 9 of the housing 3, and a plurality of recesses 56 adapted to form the support shaft 15 with the tip ends thereof protruding from the outer surface of each of the opposed wall portion 9.

One of the second slide dies 54 has a plurality of forming-projections 57 for forming the notch-like common end 18 of each blade 5.

Fourth step

As is shown in FIGS. 12 to 15, the first opening/closing die 34 is lowered, so that both the opening/closing dies 34 and 52 are closed, and the pair of second slide dies 53 and 54 are clamped between both the opening/closing dies 34 and 52.

Figure 12:
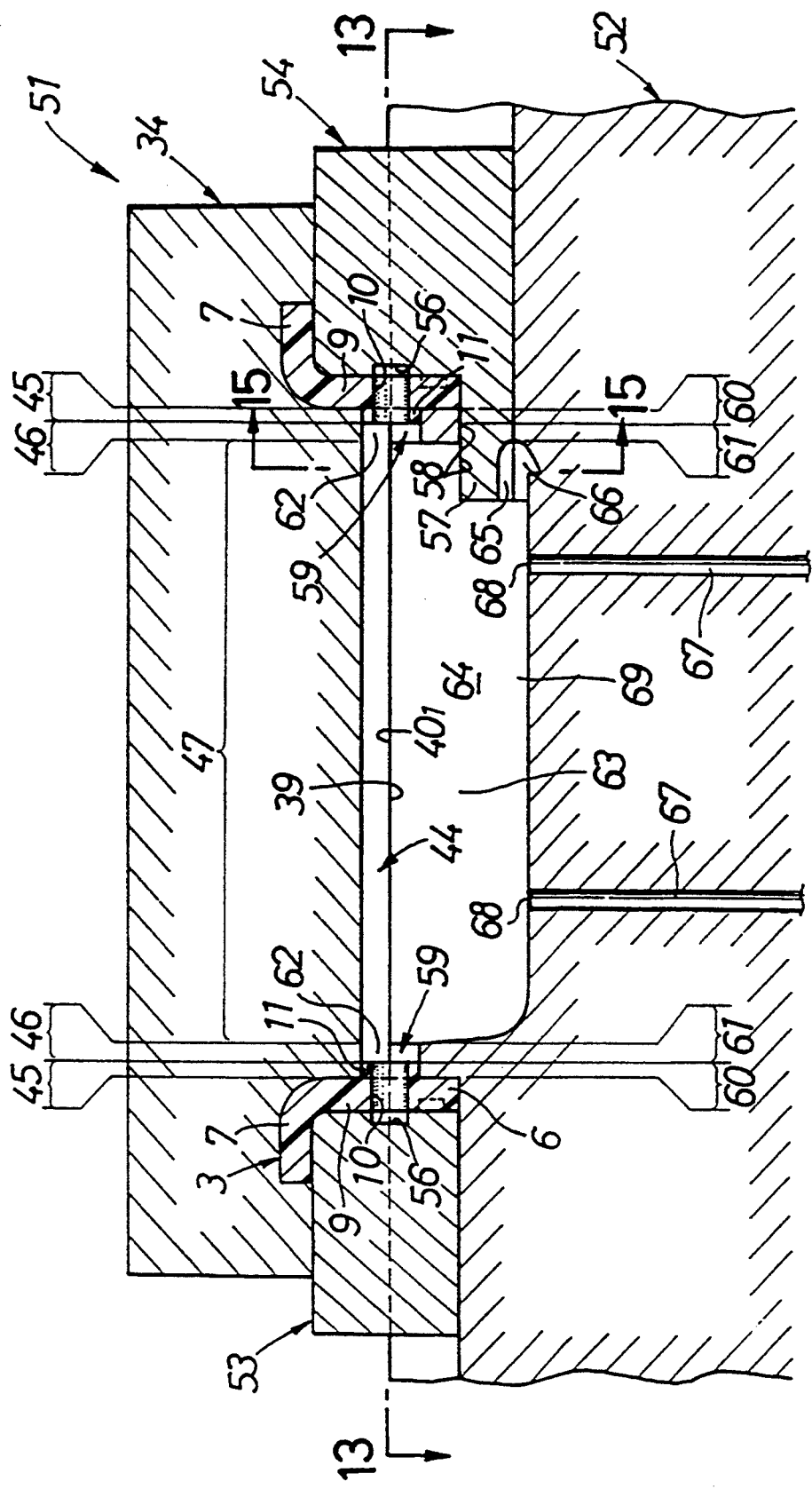
FIG. 12 is a longitudinal sectional view illustrating one example of a secondary injection molding apparatus and corresponding to a sectional view taken along a line 12—12 in FIG. 13.
Figure 13:
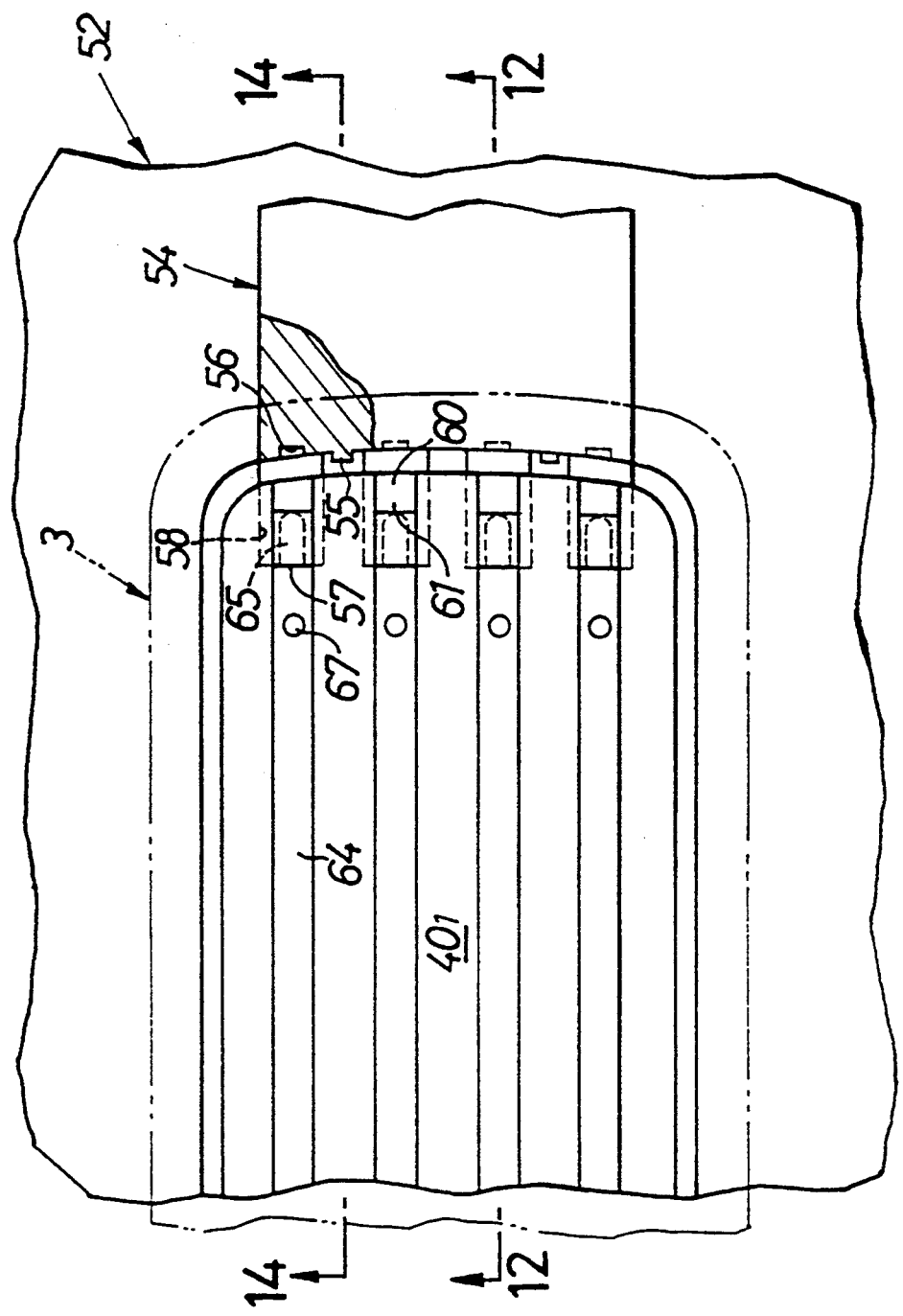
FIG. 13 is a view taken along a line 13—13 in FIG. 12.
Figure 14:
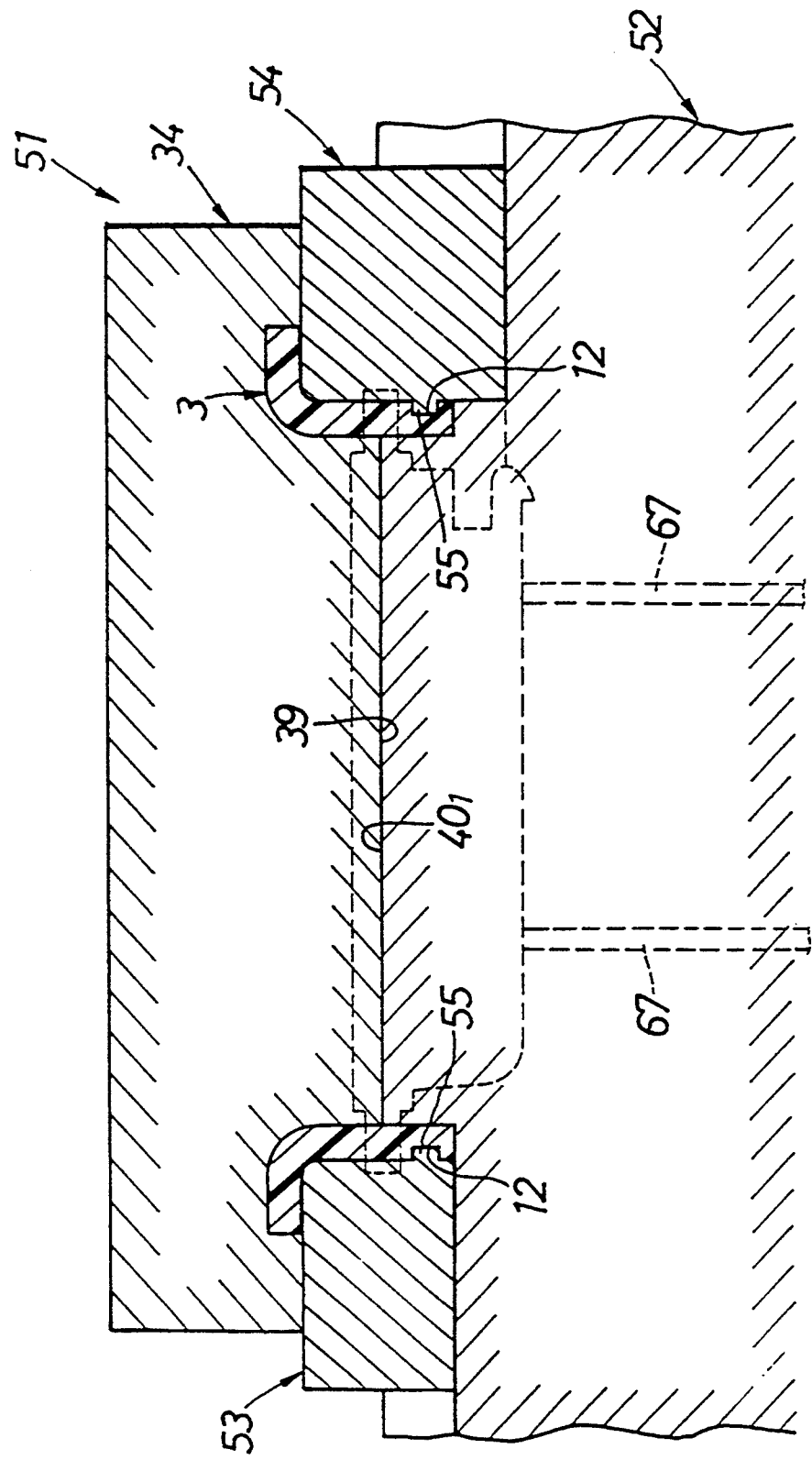
FIG. 14 is a longitudinal sectional view illustrating another example of the secondary injection molding apparatus and corresponding to a sectional view taken along a line 14—14 in FIG. 13.
Figure 15:
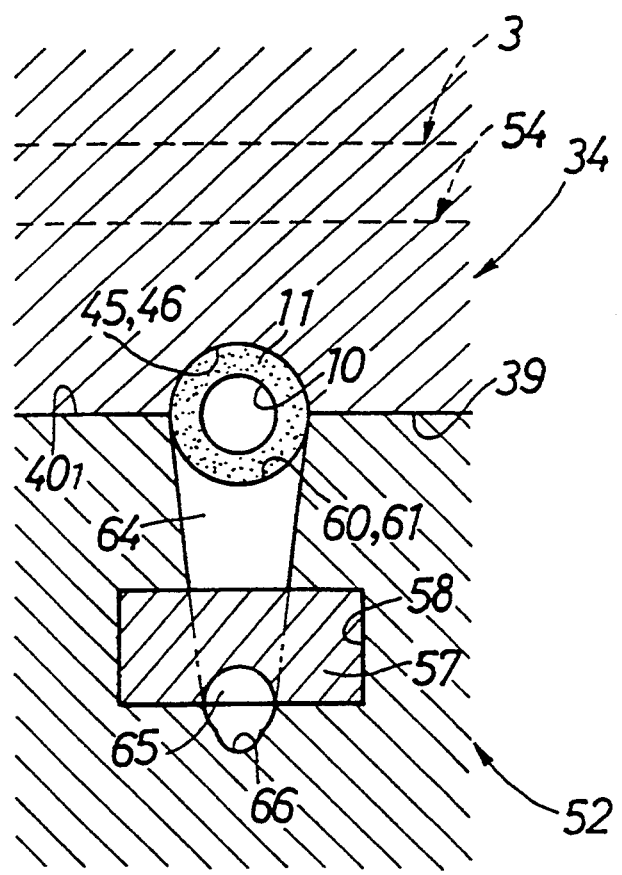
FIG. 15 is a sectional view taken along a line 15—15 in FIG. 12.

Thus, the peripheral wall 6 and the front flange 7 of the housing 3 are clamped between the opening/closing dies 34 and 52 and the second slide dies 53 and 54, so that the protrusions 55 of each of the second slide dies 53 and 54 are fitted into the recesses 12 of the housing 3, respectively. And the recesses 56 are disposed coaxially with the shaft bores 10 in the housing 3, respectively, as best shown in FIG. 14. Further, as best shown in FIGS. 12 and 15, the forming portions 57 of the one second slide die 54 are passed through slide bores 58 in the third opening/closing die 52, respectively.

The third opening/closing die 52 has a plurality of second recesses 59 having a semi-circular section and opposed to the first recesses 44 in the first opening-closing die 34, respectively, so that the bosses 11 are clamped between boss-corresponding areas 45 and 60 of the first and second recesses 44 and 59, respectively. A third cavity 62 for forming the protruding portion 14 is defined between each of the protruding portion-corresponding areas 46 of the first recesses 44 and each of protruding portion-corresponding areas 61 of the second recesses 59. The third cavities 62 communicate with the shaft bores 10 and are disposed coaxially with the shaft bores 10 and the bosses 11, respectively.

Further, a fourth cavity 64 for forming the blade body 4 is defined between the front edge-corresponding area 47 of each of the first recess 44 in the first opening-closing die 34 and each of deep recesses 63 which are opened in a matched surface $40_1$ between the two second recesses 59 of the third opening/closing die 52. The fourth cavities 64 communicates with the third cavities 62, respectively. Each of the shaft bores 10 in the housing 3 functions as a fifth cavity for forming the support shaft 15.

A sixth cavity 65 for forming the pivotally supporting portion 20 is defined between each of the forming portions 57 of the one second slide die 54 and the slide surface of the third opening/closing die 52. A seventh cavity 66 for forming the slip-off preventing projection 21 is defined in the third opening/closing die 52 and opened into each of the sixth cavities 65. In this way, the structure of each of the sixth and seventh cavities 65 and 66 is simplified in correspondence to the structure of the pivotally mounting portion 17.

The third opening/closing die 52 is provided with a plurality of ejector pins 67. Abutment faces 68 of each pair of ejector pins 67 are exposed to rear edge-corresponding area 69 which forms the rear edge 22 of the blade body 4.

Fifth step

Figure 16:
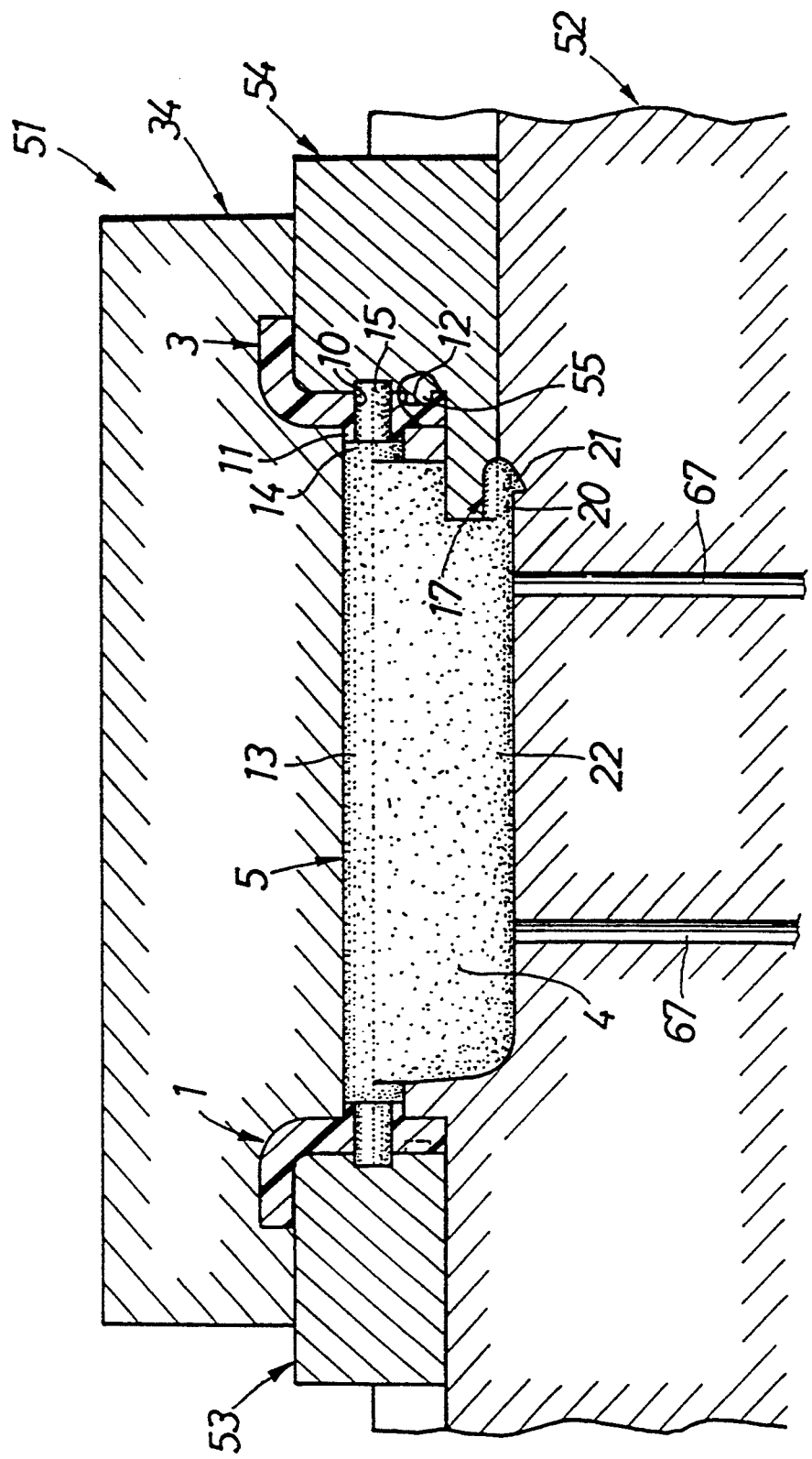
FIG. 16 is a longitudinal sectional view of the secondary injection molding apparatus shown with a blow-out port device formed.
Figure 17:
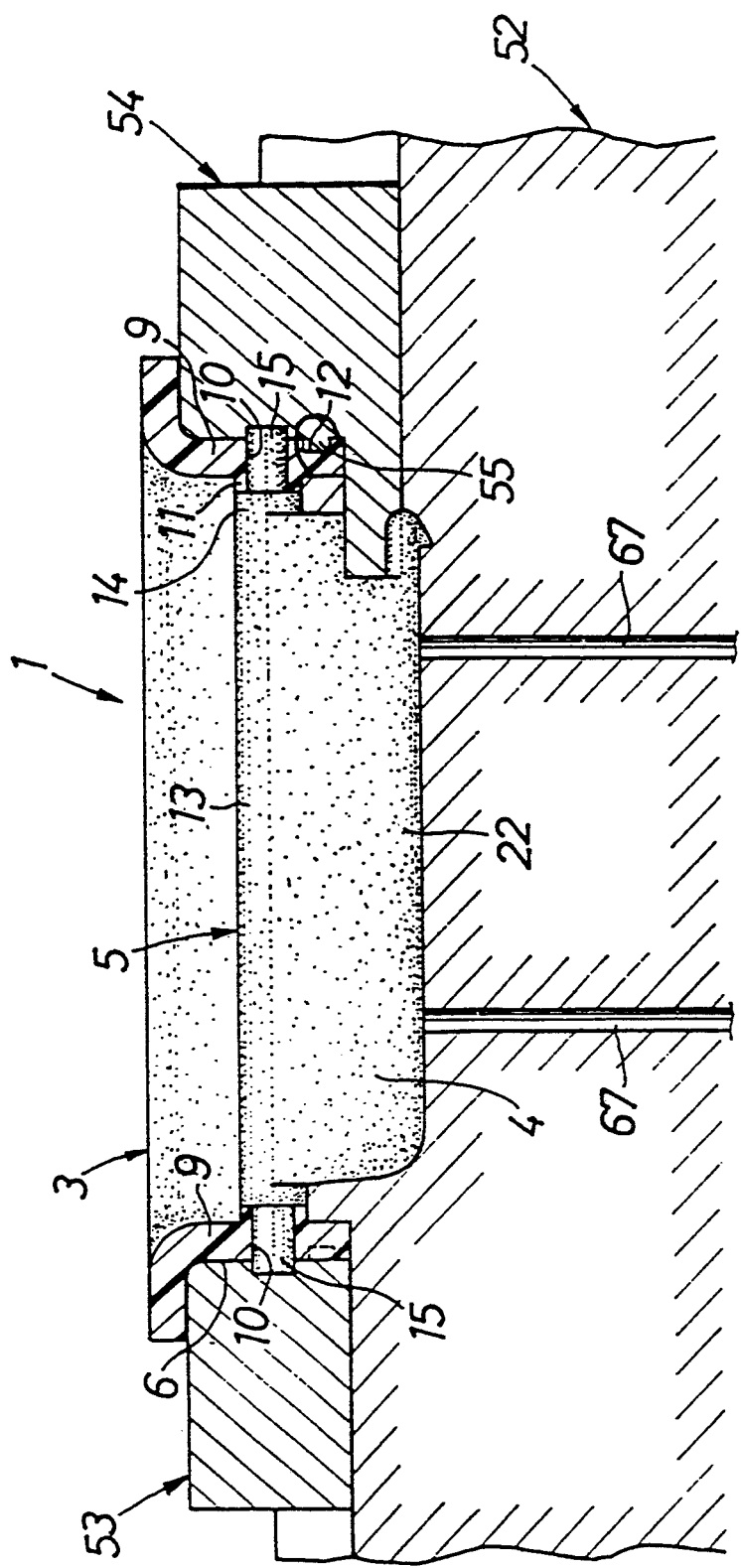
FIG. 17 is a longitudinal sectional view of the secondary injection molding apparatus shown with the blow-out port device left on a third opening/closing die.

As is shown in FIG. 16, a polybutylene terephthalate (PBT) based resin as a synthetic resin is secondarily injected through a gate (not shown) into the third to seventh cavities 62, 64, 10, 65 and 66 to form blades 5, thereby providing a blow-out port device 1.

In this case, the protruding portions 14 are formed coaxially with the bosses 11, respectively, because the third cavities 62 for forming the protruding portions of the blades 5 are arranged coaxially with the bosses 11, respectively.

In addition, because the primary and secondary injection steps are carried out by common use of the opening/closing die 34, the cost of the opening/closing dies can be reduced, and the cost and working time required to replace the die can be omitted to improve the mass productivity of the blow-out port device.

Sixth step

The first opening/closing die 34 is lifted to open both the opening/closing dies 34 and 52. And the blow-out device 1 left on the third opening/closing die 52 by fitting engagement of the recesses 12 in the housing 3 with the protrusions 55 of the second slide dies 53 and 54, respectively.

Then, the second slide dies 53 and 54 are retreated, so that the protrusions 55 thereof are separated from the corresponding recesses 12 of the housing 3, and the recesses 56 are separated from the corresponding tip ends of the support shafts 15, respectively. Then, the ejector pins 67 are brought into abutment against the rear edges 22 of the blade bodies 4 to eject the blow-out port device 1 from the third opening/closing die 52.

When the device is released from the die in this manner, the blades 5 are ejected by the ejector pins 67 and hence, a force supporting the housing 3 is only applied to each of the support shafts 15, and the force of this degree cannot damage each of the support shafts. In addition, because an ejecting force is applied directly to each of the blades 5 which are tightly contacted with the forming surface, the releasability of each blades 5 is good and therefore, the blade 5 cannot be damaged.

Further, the appearance of the blow-out port device 1 cannot be injured from the view point that each of the recesses 12 in the housing 3 is located in the outer surface of each of the opposed wall portions 9 and that these opposed wall portions 9 are disposed within the instrument panel 8. Further, an ejector pin abutment portion of each of the blades 5 is established at the rear edge 22 of the blade 5 which is not visible from the front of the device 1 and therefore, the appearance of the blow-out port device cannot be injured likewise.

Figure 18:
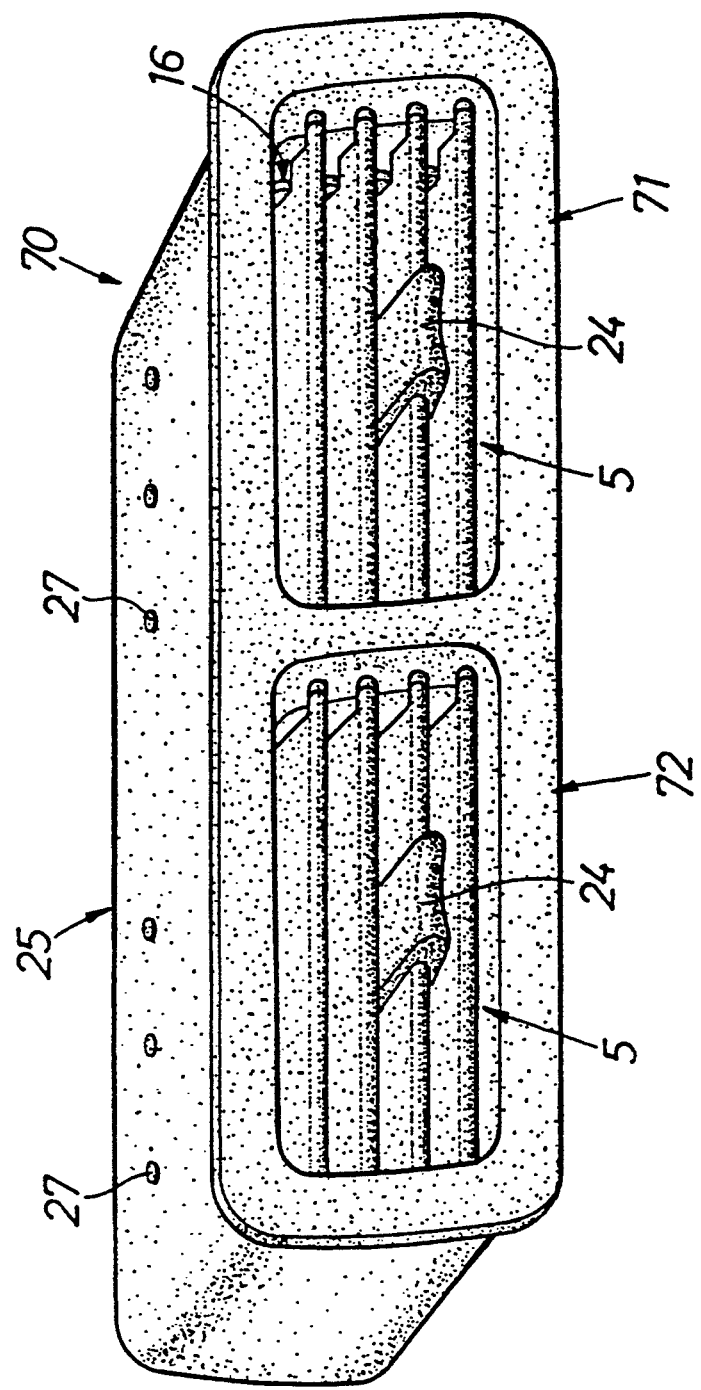
FIG. 18 is a perspective view illustrating another example of an air-conditioning blow-out port device.

FIG. 18 illustrates another example of an air-conditioning blow-out port device 70. This device 70 has a construction similar to the construction of the two blow-out port devices arranged laterally. The above-described two-stage injection molding process is also applicable to the molding of such a blow-out port device 70. In this case, a pivotally mounting portion 17 for an interlocking link 16 is provided at a right end of each of blades 5 in a right blow-out port structure 71, and at a left end of each of blades 5 in a left blow-out port structure 72.

What is claimed is:

1. A process for two-stage injection molding of an air-conditioning blow-out port device comprising:

a housing of synthetic resin, which includes pairs of shaft bores provided in a coaxial arrangement in opposed wall portions of a peripheral wall to extend through the opposed wall portions, and a plurality of blades of synthetic resin which each include a pair of support shafts projectingly provided at opposite ends of a blade body disposed within the housing and rotatably fitted in the shaft bores of the housing, the process comprising the steps of:

closing a pair of housing-forming opposed opening-closing dies to clamp, between both the opening-closing dies, a plurality of first opposed slide dies each including a plurality of shaft bore-forming cores and a plurality of protrusions juxtaposed with the cores, thereby defining a housing-forming cavity so as to include the shaft bore-forming cores and the protrusions;

primarily injecting a synthetic resin into the cavity to form the housing including the shaft bores and a plurality of recesses in the opposed wall portions, the recesses being formed by the corresponding protrusions of the first slide dies and opened into outer surfaces of the opposed wall portions;

retreating the first opposed slide dies such that the shaft bore-forming cores and the protrusions are removed from the corresponding shaft bores and recesses formed in the housing, and opening the pair of housing-forming opposed opening-closing dies leaving the housing attached to one of the opening-closing dies;

closing the one of the opening-closing dies for forming a front edge of each blade body located on a side of a front surface of the housing, while closing another opening-closing die for forming a rear edge of each blade body, another opening-closing die including a plurality of second opposed slide dies each having a plurality of protrusions corresponding to the recesses formed in the housing, thereby clamping the second slide dies between both of these opening-closing dies, with the housing being clamped between these opening-closing dies and the second slide dies and with the protrusions of the second slide dies being fitted into the recesses of the housing, respectively, while defining blade body-forming cavities between these opening-closing dies;

using the shaft bores in the housing as support shaft-forming cavities and secondarily injecting a synthetic resin into the blade body-forming cavities and the support shaft-forming cavities to form the blade bodies and the rotatably fitted support shafts of the blow-out port device;

opening both the opening-closing dies, with the blow-out port device being left on the another opening-closing die by the fitting of the protrusions of the second slide dies into the recesses in the housing; and separating the protrusions of the second slide dies out of the corresponding recesses, and then bringing a plurality of ejector pins provided on the another opening-closing die into abutment against the rear edges of the blade bodies respectively to push off the blow-out port device from the other opening/closing die.

* * * * *